Patented Jan. 2, 1923.

1,440,652

UNITED STATES PATENT OFFICE.

ROGER ADAMS, OF URBANA, AND ERNEST H. VOLWILER, OF CHICAGO, ILLINOIS, ASSIGNORS TO THE ABBOTT LABORATORIES, OF CHICAGO, ILLINOIS, A CORPORATION OF ILLINOIS.

N-BUTYL ESTERS OF PARA-AMINO BENZOIC ACID.

No Drawing.   Application filed March 19, 1920.   Serial No. 367,228.

*To all whom it may concern:*

Be it known that we, ROGER ADAMS and ERNEST H. VOLWILER, residing, respectively, at Urbana, in the county of Champaign and State of Illinois, and at Chicago, in the county of Cook and State of Illinois, both citizens of the United States of America, have invented certain new and useful Improvements in N-Butyl Esters of Para-Amino Benzoic Acid, of which the following is a specification.

Our invention relates to improvements in esters of aromatic acids, and has particular reference to the n-butyl esters.

The principal object of the invention is to provide a compound of the class described which shall have more lasting anesthetic properties than compounds hitherto prepared.

*The general method of synthesizing compounds of this series.*

The nitro derivatives of n-butyl esters of aromatic acids are treated with iron powder and hydrochloric acid, keeping the temperature of the mixture at 50° and continuing the reaction until all the nitro compound is dissolved. When a clear liquid results, the reaction mixture is carefully made neutral, or, if no hydroxyl group is present, alkaline, and the free amino compound extracted with ether. Upon evaporation of the ether solution, the amino compounds desired are obtained. In order to produce a substituted amino derivative, the primary amino compound is treated with an alkyl halide under the usual conditions.

*Specific compounds in this series.*

A specific compound belonging to the general series as above defined is the n-butyl ester of p-amino-benzoic acid. This is made by the reduction of the n-butyl ester of p-nitro benzoic acid. Since this latter compound has not yet been described, a brief mention of its method of preparation is given here. A mixture of 50 g. of p-nitro benzoic acid, 125 g. of butyl alcohol, 8 cc. of concentrated sulfuric acid, are refluxed for eight hours. The reaction mixture is then vacuum-distilled in order to recover the excess alcohol, residue treated with dilute sodium carbonate solution, then extracted with ether, dried, and then distilled. After the ether has been removed, the residue is warmed up to vacuum for some time to remove the remainder of the n-butyl alcohol. The residue consists of fairly pure n-butyl ester of p-nitrobenzoic acid, which may be crystallized from petroleum ether. It forms large white plates, melting point 35°.

25 g. of the nitro ester just mentioned is mixed with 100 g. of powered iron, and 20% hydrochloric acid is gradually added, the mixture being kept at about 50° during the reduction. Stirring is carried on constantly and the reaction continued until no more ester remains. The reaction mixture is then filtered from the excess iron, made alkaline with sodium hydroxide and extracted with ether. The ether solution upon evaporation yields the n-butyl ester of p-amino benzoic acid, which may be crystallized from water or petroleum ether. It has a melting point, when pure, of 57-58½°.

This material is an anesthetic compound which may be used locally, internally, for dusting on wounds, and for anesthetic purposes in general, and its formula is as follows:

Another specific compound of this series is the normal butyl ester of 1.3.5 diamino benzoic acid, which is prepared as follows:

An excess of normal butyl alcohol is added to the acid chloride of 1.3.5. dinitro benzoic acid and refluxed for an hour. The excess of butyl alcohol is removed by distillation in vacuo and the normal butyl ester of 1.3.5 dinitro benzoic acid solidifies upon cooling.

This is reduced to the normal butyl ester of 1.3.5 diamino benzoic acid with iron and hydrochloric acid and the product thus obtained is a viscous liquid which does not solidify at room temperature.

These compounds have the property of producing a much more lasting anesthesia than compounds such as ethyl of para-amino benzoic acid, the duration being a plurality of times longer in the case of the n-butyl compounds.

The monohydrochloride of 1.3.5 normal butyl diamino benzoate is prepared by treating an ether solution of the ester with one mole of alcoholic hydrochloric acid. The monohydrochloride settles out as a white solid which melts with decomposition at 255°.

We claim as our invention:

1. A new compound of the formula

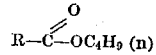

where R is an amino aryl radicle.

2. As a new article of manufacture, the n-butyl ester of an amino benzoic acid.

3. As a new article of manufacture, the n-butyl ester of para-amino benzoic acid.

ROGER ADAMS.
ERNEST H. VOLWILER.